US008931403B2

(12) United States Patent  
Forrest et al.

(10) Patent No.: US 8,931,403 B2
(45) Date of Patent: Jan. 13, 2015

(54) OIL FILTERING DEVICE

(75) Inventors: Paul Glenn Forrest, Baltimore, MD (US); Charles Amoss, Baltimore, MD (US); Darrin P. Furgason, Baltimore, MD (US)

(73) Assignee: Illinois Tool Works, Inc., Glenview, IL (US)

( * ) Notice: Subject to any disclaimer, the term of this patent is extended or adjusted under 35 U.S.C. 154(b) by 876 days.

(21) Appl. No.: 12/196,008

(22) Filed: Aug. 21, 2008

(65) Prior Publication Data

US 2009/0049994 A1  Feb. 26, 2009

Related U.S. Application Data

(60) Provisional application No. 60/957,379, filed on Aug. 22, 2007.

(51) Int. Cl.
*A47J 37/12* (2006.01)
*B01D 35/027* (2006.01)

(52) U.S. Cl.
CPC ......... *A47J 37/1223* (2013.01); *B01D 35/0273* (2013.01)
USPC ...................................... 99/408; 210/167.28

(58) Field of Classification Search
USPC .......... 210/167.28, DIG. 8; 99/408; 426/417; 4/686; 285/32, 298–303
See application file for complete search history.

(56) References Cited

U.S. PATENT DOCUMENTS

| 982,836 | A | * | 1/1911 | Ley .............................. 285/302 |
| 3,483,981 | A | * | 12/1969 | Gordon .................... 210/167.28 |
| 3,735,871 | A | * | 5/1973 | Bisko ....................... 210/167.28 |
| 4,113,623 | A | * | 9/1978 | Koether et al. .......... 210/167.28 |
| 4,328,097 | A | * | 5/1982 | Whaley et al. ........... 210/167.28 |
| 4,591,434 | A | * | 5/1986 | Prudhomme ................ 210/117 |
| 4,969,217 | A | * | 11/1990 | Gandini ......................... 4/686 |
| 5,160,174 | A | * | 11/1992 | Thompson .................... 285/32 |
| RE34,636 | E | * | 6/1994 | Bivens ........................... 99/408 |
| 5,870,945 | A | * | 2/1999 | Bivens ........................... 99/408 |
| 6,312,598 | B1 | * | 11/2001 | Munson et al. ............ 210/317 |
| 6,378,420 | B1 | * | 4/2002 | Savage et al. ................ 99/408 |
| 6,482,326 | B2 | * | 11/2002 | Munson et al. ............ 210/663 |
| 6,572,764 | B2 | * | 6/2003 | Mullaney, Jr. ........... 210/167.28 |
| 6,890,428 | B2 | * | 5/2005 | Mullaney, Jr. ........... 210/167.28 |
| 2005/0056157 | A1 | * | 3/2005 | Savage et al. ................ 99/408 |
| 2006/0013931 | A1 | * | 1/2006 | Bivens et al. ............... 426/417 |

* cited by examiner

*Primary Examiner* — Mark Graham
(74) *Attorney, Agent, or Firm* — Baker & Hostetler LLP

(57) ABSTRACT

An oil filtering system for a storage unit configured to receive and hold oil from a fryer in a main storage space thereof includes a filtering unit and a conveying unit. The filtering unit is removably arranged on an inner bottom surface of the storage unit within the main storage space and configured to filter the oil in the storage unit via lower and upper filtering layers thereof. The conveying unit is removably connected to the filtering unit and has a portion extending upwardly from the filtering unit within the main storage space for conveying the filtered oil from the filtering unit.

20 Claims, 10 Drawing Sheets

OIL FILTERING DEVICE

CROSS REFERENCE TO PRIOR APPLICATION

This application claims priority and the benefit thereof from U.S. Provisional Patent Application Ser. No. 60/957,379 filed on Aug. 22, 2007, which is hereby incorporated by reference for all purposes as if fully set forth herein.

BACKGROUND OF THE DISCLOSURE

1. Field of the Disclosure

The disclosure is directed to fryers, and more particularly to an oil filtering device for use in fryers.

2. Related Art

Fryers typically include one or more fryer vats, and each vat may include a heating bath filled with heated cooking oil for cooking food products immersed therein. Some fryers may be equipped with a filtration system to manually or mechanically filter cooking oil drained from a fryer vat and return the filtered cooking oil to the fryer vat. As an example, FIGS. 1 and 2 show a deep-fat fryer disclosed in U.S. Pat. No. 6,890,428, which is incorporated herein by reference in its entirety.

Referring to FIG. 1, a perspective view of a prior art fryer 10 including two fryer vats 12A and 12B is shown. Each fryer vat 12A, 12B includes at least one respective basket 16A and 16B which is typically movable upward and downward via respective positioning guides 18A and 18B. The fryer 10 includes a frame 20 which preferably includes associated housing 22. A front panel 24 of the fryer 10 includes a control and display panel 26A and 26B for each fryer vat. The lower portion of the housing frame includes a set of doors 30A, 30B which are movable between open and closed positions. Below the doors 30A, 30B, a drawer 32 which is movable between open and closed positions relative to the frame 20 is provided. Positioned within the drawer 32 is an oil receiving pan 34 having a rim 36 which sits on rails 38 of the drawer 32. Handles 40 extend from the interior sidewalls of the pan 34. The pan 34 may also include lips or flanges 212, 214. A basket type screen 42 is removably positioned within the pan 34 for filtering out debris entering the pan 34 within oil which is drained from one of the fryer vats 12A and 12B.

At the bottom of the pan 34, a filter assembly 45 is provided for filtering the oil. An oil return path from the pan 34 back to the fryer vat 12A, 12B is formed in part by a coupler 44 which is connected to and extends from a front sidewall of the pan 34. The coupler 44 extends rearwardly back toward the fryer frame 20. A corresponding coupler 46 (shown in FIG. 2) is positioned on the fryer frame 20, with the two couplers aligned for slidingly mating with each other when the drawer 32 is moved to a closed position.

Referring now to FIG. 2, the pan 34 includes an outlet opening 48 through its bottom wall 50. The oil return path is formed in part by a flow passage through member 52 and piping 54 which runs along the external surface of bottom wall 50 and front wall 56 of the pan 34. Near the top of front wall 56, a wall penetrating coupling assembly 58 passes through the wall 56, with piping 60 extending upward from the pan 34 and rearwardly as shown. The end of piping 60 acts as the return coupler 44, which mates with corresponding coupler 46 connected to an oil pump 110. A handle member 112 is connected to the opening and flange at the upper side of the filter assembly 45 to seal off the upper side opening.

The oil pump 110 is used for drawing oil out of the pan 34. Oil traveling out of the pan 34 during a filtration operation travels from the pan 34, through the outer filter screen material of the filter assembly 45, into the interior of the filter assembly 45, and out of the interior of the filter assembly 45.

As described above, the prior art fryer 10 shown in FIGS. 1 and 2 requires numerous holes to be bored into the pan 34 along with numerous welds to attach a structure thereto. Furthermore, the arrangement includes multiple parts and fittings. This complex configuration increases the manufacturing and repair costs. In particular, the complex assembly of the pan 34, the flow passage through member 52, the pipe 54, the wall penetrating coupling assembly 58 and the like and repair thereof require increased labor and parts cost. Further, the complex structure is more likely to fail and may need to be repaired and maintained frequently.

SUMMARY OF THE DISCLOSURE

According to an aspect of the disclosure, an oil filtering system for a storage unit configured to receive and hold oil from a fryer in a main storage space thereof, includes a filtering unit removably arranged on an inner bottom surface of the storage unit within the main storage space and configured to filter the oil in the storage unit via lower and upper filtering layers thereof, and a conveying unit removably connected to the filtering unit and having a portion extending upwardly from the filtering unit within the main storage space for conveying the filtered oil from the filtering unit.

The storage unit may include a bottom wall, side walls and a main opening exposing the main storage space surrounded by the bottom wall and the side walls.

The filtering unit may include a first filtering unit including the lower and upper filtering layers and configured to filter the oil from the main storage space via the lower and upper filtering layers, and a second filtering unit including a middle filtering layer removably arranged between the lower and upper filtering layers and configured to filter the oil filtered by the lower and upper filtering layers. The filtering unit may be machine-washable. The middle filtering layer may include stainless steel basket weave mesh.

The lower and upper filtering layers may include a stainless steel mash screen. The particulate filtration of the filtering unit may be about 80 microns. The first filtering unit may further include a frame configured to seal edges of the lower and upper filtering layers, an opening exposing an inner space between the lower and upper filtering layers, and a removable cap configured to seal the opening.

The lower and upper filtering layers may include a microfiltration fabric. The first filtering unit may include a filtering envelope including the lower and upper filtering layers and an opening exposing an inner space between the first and second filtering layers, and a removable clip for sealing the opening of the filtering envelope. The particulate filtration of the filtering unit may be about 0.5 micron.

The conveying unit may include a first end portion connected to the filtering unit, a second end portion arranged outside the main storage space, and a tube extending between the first end portion and the second end portion.

The filtering unit may further include a through hole extending through the lower, middle and the upper filtering layers. The first end portion of the conveying unit may include a male member including a base arranged between the inner bottom surface of the storage unit and the lower filtering layer, and a protruded portion extended from the base and traversing the through hole of the filtering unit, and a female member arranged on the upper filtering layer and configured to removably engage the protruded portion of the male member.

The storage unit may include a recess portion formed on the inner bottom surface thereof to receive the base of the male member. The first end portion may further include at least one oil port formed at the protruded portion of the male member and arranged adjacent to the middle filtering layer to receive the filtered oil therefrom, and an oil path extended from the at least one oil port to the tube to convey the filtered oil from the at least one oil port to the tube. The protruded portion of the male member and the female member may form a screw connection.

The filtering unit may further include a first ring covering a portion of the middle filtering layer around the through hole, the first ring including at least one opening arranged adjacent to the at least one oil port of the first end portion. The filtering unit may further include a second ring covering a portion of the lower filtering layer around the through hole, and a third ring covering a portion of the upper filtering layer around the through hole. The first ring may be arranged between the second and third rings, and the first, second, third rings may be stacked together and arranged between the male member and female member.

The conveying unit may further include a height adjustment unit for increasing or decreasing a height of the conveying unit. The height adjustment unit may include a jam nut.

The tube may include a first portion extending vertically from the first end portion towards the main opening of the storage unit, a second portion extending horizontally from the first portion towards the side wall of the storage unit, a third portion extending vertically from the second portion along the side wall of the storage unit towards an outside of the main storage space of the storage unit, and a fourth portion arranged outside the main storage space and extending from the third portion towards the second end portion.

The oil filtering system may further include a holding unit arranged on an inner surface of the sidewall and configured to support the third portion of the tube. The oil filtering system may further include an oil suction unit configured to engage the second end portion of the conveying unit.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
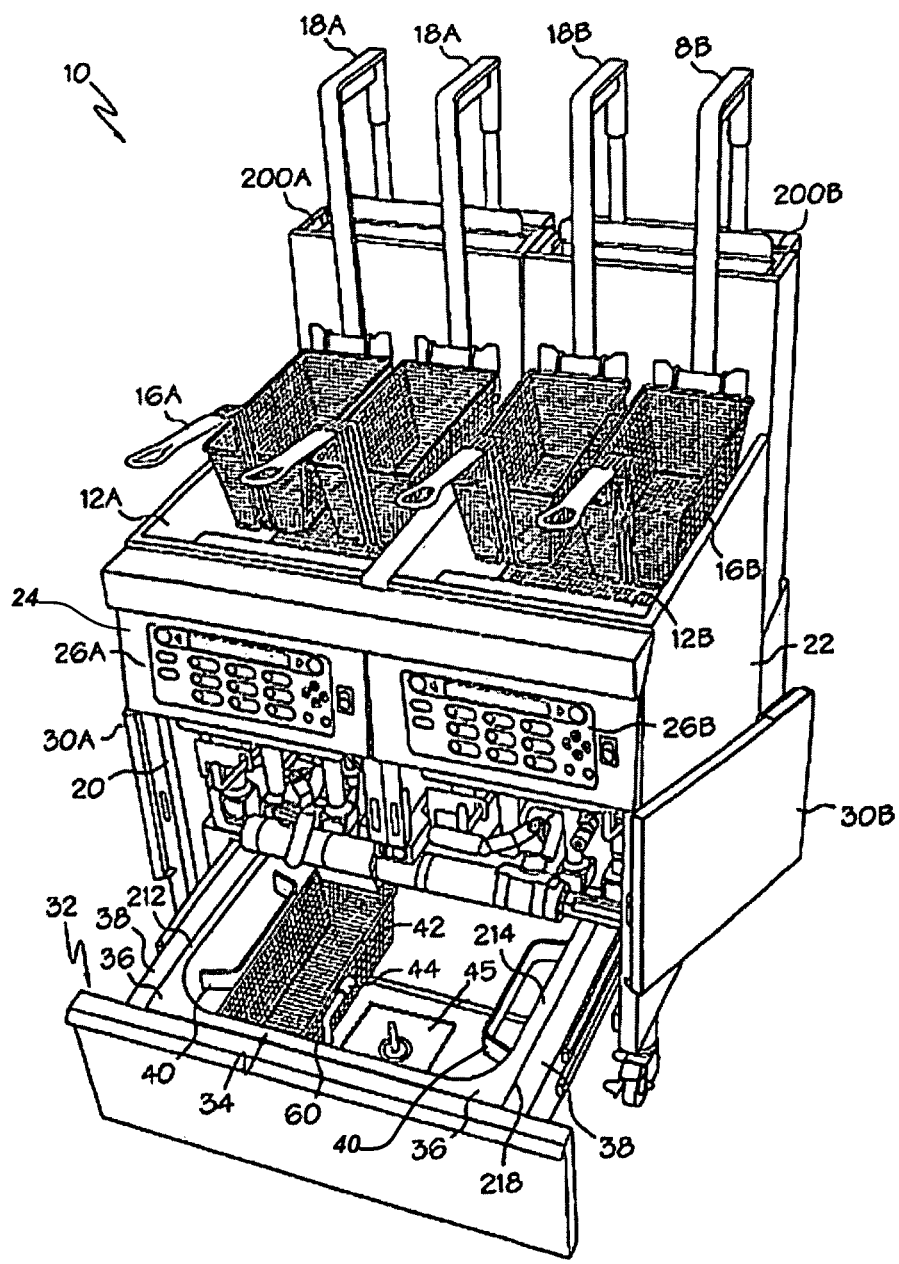
FIG. 1 shows a front perspective view of an exemplary prior art fryer.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
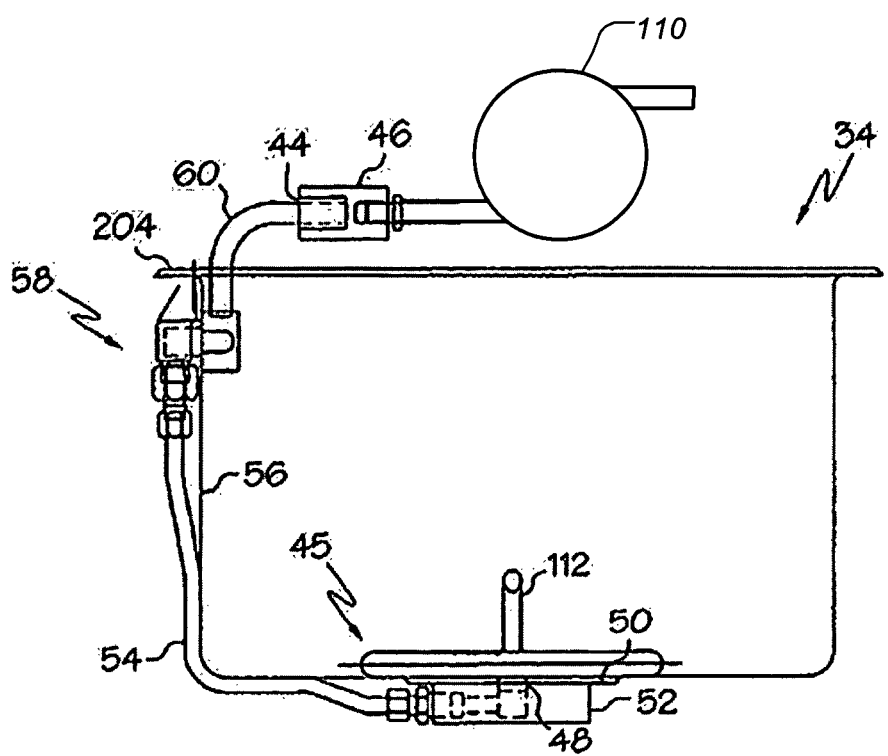
FIG. 2 shows a side view of an oil pan of the exemplary prior art fryer shown in FIG. 1.
Figure 3:
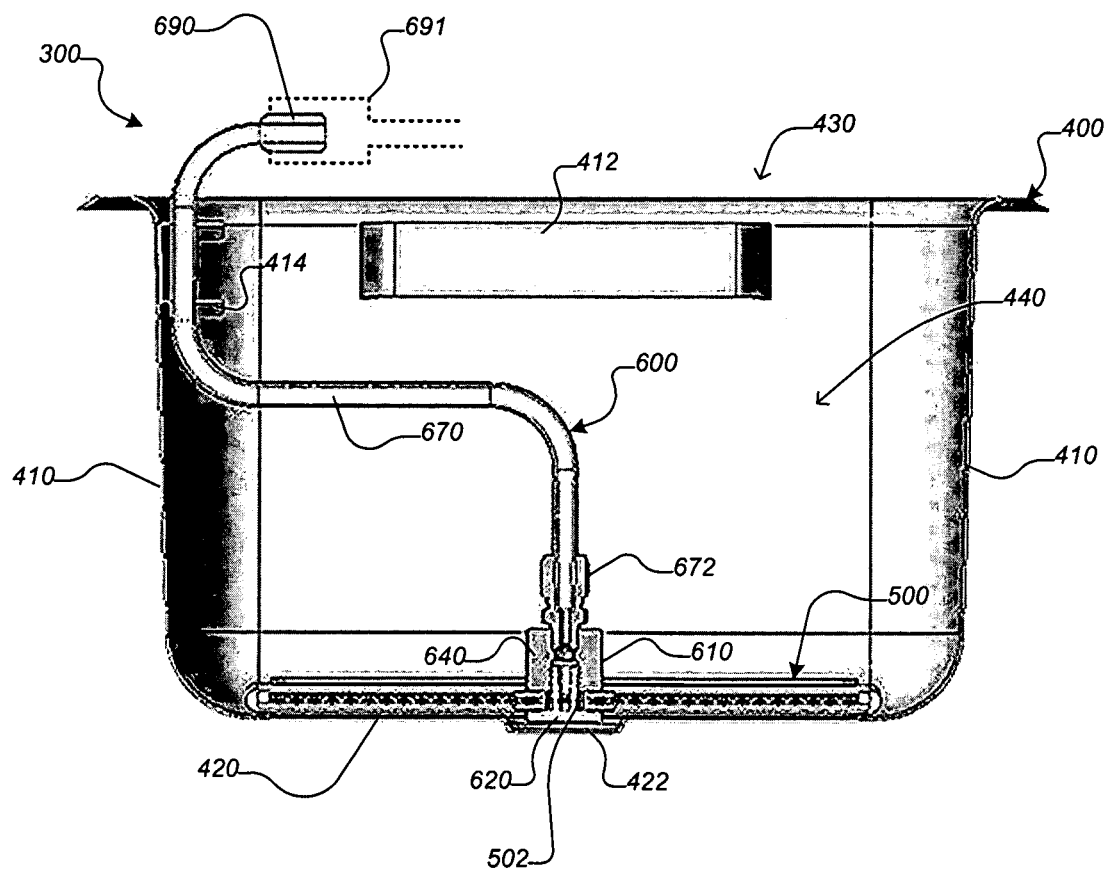
FIG. 3 shows a cross-sectional view of an oil filtering system constructed in accordance with the disclosure.

FIG. 3 shows a cross-sectional view of an oil filtering system 300, constructed according to an embodiment of the disclosure. The oil filtering system 300 may be used in conventional fryers such as the fryer 10 shown in FIG. 1 or the like. For example, the oil filtering system 300 may be used as a replacement of the prior art oil pan design shown in FIG. 2 or may be used in new fryers. The use of the oil filtering system 300, however, may not be limited to the fryer 10 shown in FIG. 1, and may be used in any fryers of any configuration, such as, for example, a fryer with a single fryer vat, three or more fryer vats, or the like. The oil filtering system 300 may include a storage unit 400, a filtering unit 500, a conveying unit 600, and/or the like.

The storage unit 400 may have side walls 410, a bottom wall 420 and an opening 430 which exposes a main storage space 440 surrounded by the side walls 410 and the bottom wall 420. Handles 412 (only one is shown) may be provided on two opposite inner surfaces of the side walls 410. Other locations for the handles 412 are also contemplated. The storage unit 400 may be constructed as a pan, such as, e.g., a single deep drawn stainless steel pan with no welded seams. Such the storage unit 400 may be lighter and easier to clean. However, any type of apparatus that may hold oil drained thereto is contemplated.

The filtering unit 500 may be arranged at a bottom portion of the main storage space 440, for example, on an inner surface of the bottom wall 420 of the storage unit 400. Other locations are contemplated. The conveying unit 600 may be connected to the filtering unit 500 to convey the filtered oil from the filtering unit 500 to a desired location, such as, e.g., an oil pump or the like. The conveying unit 600 may extend from the bottom portion of the main storage space 440 towards an outside edge the main storage space 440 and out of the opening 430. In an embodiment, a substantial portion of the conveying unit 600 may be arranged within the main storage space 440, and no portion of the conveying unit 600 may be arranged on outer surfaces of the side walls 410 and bottom wall 420. Thus, it may not be necessary to form an opening at the side wall 410 and/or the bottom wall 420 of the storage unit 400 to establish an oil return path as shown in FIG. 2, thereby simplifying the manufacturing process and reducing the manufacturing costs. Also, the internal arrangement of the conveying unit 600 may allow for the hot oil to heat the same. This may result in fewer clogs caused by oil that has solidified and the like.

The storage unit 400 may be configured to be deeper and/or wider than the pan 34 shown in FIG. 2, thereby containing more oil in the main storage space 440 for filtration. Because fewer components may be arranged on the outer surfaces of the storage unit 400, handling, removing, repairing, carrying and so on of the oil filtering system 300 may be easier and more user friendly, at least because the simpler mechanism is easier to insert and remove from the fryer.

Figure 4A:
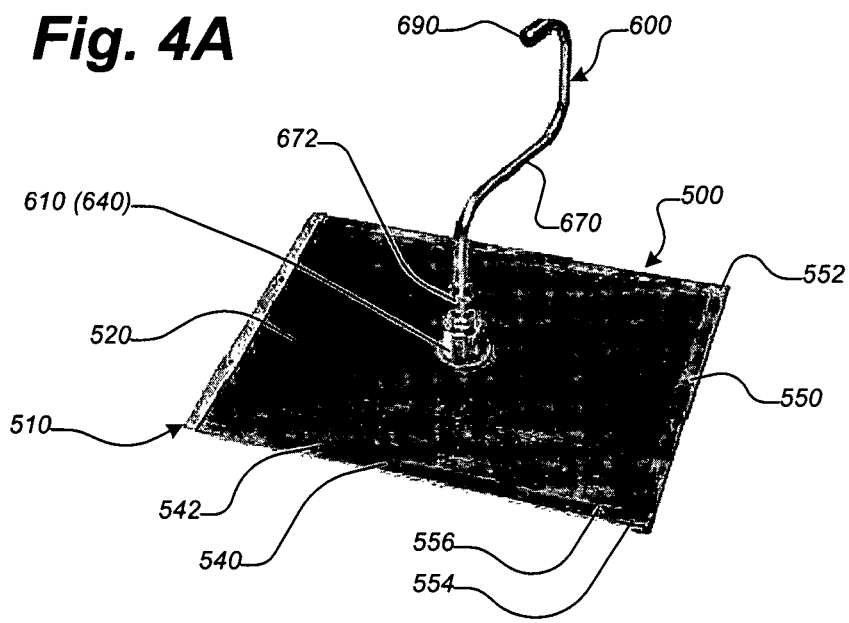
FIG. 4A shows a perspective view of an assembly of the filtering unit and the conveying unit of the oil filtering system shown in FIG. 3, constructed in accordance with the disclosure.
Figure 4B:
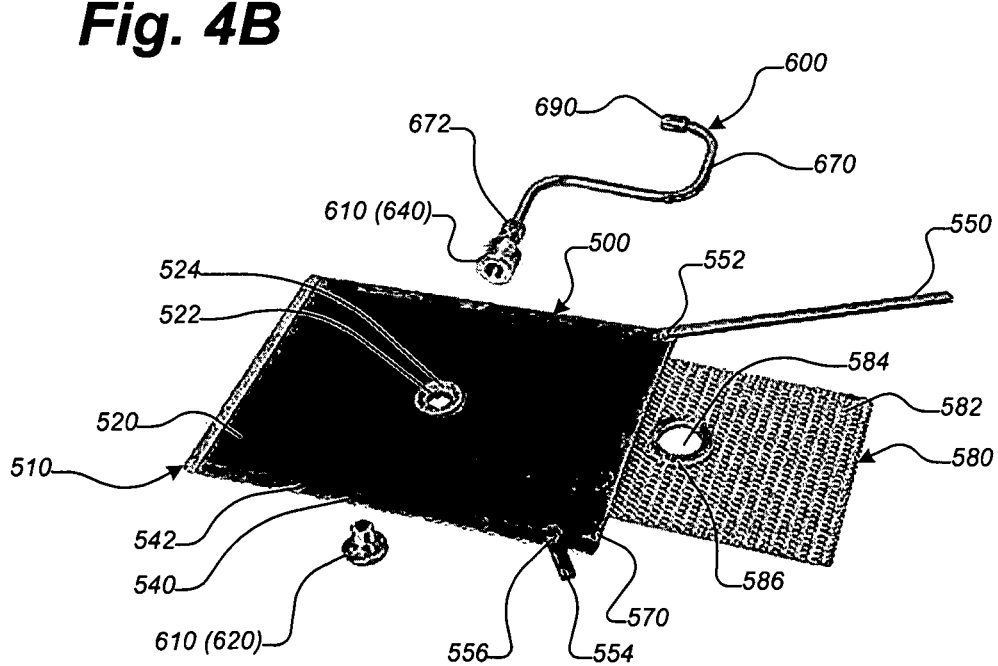
FIG. 4B shows an exploded perspective view of the filtering unit and the conveying unit of the oil filtering system shown in FIG. 4A.

FIG. 4A shows a perspective view of an assembly of the filtering unit 500 and the conveying unit 600 of the oil filtering system 300 shown in FIG. 3; and FIG. 4B shows an exploded perspective view of the filtering unit 500 and the conveying unit 600 shown in FIG. 4A. The filtering unit 500 may be configured with a filtering envelop 510 and a filtering insert 580. The filtering envelop 510 may be constructed with an upper filtering layer 520, a lower filtering layer 530 (shown in FIG. 10), a main opening 570 (shown in FIG. 4B) exposing an inner space between the lower and upper filtering layers 520, 530, and/or the like. The filtering insert 580 may be inserted into and removed from the inner space of the filtering envelop 510 via the main opening 570. The particulate filtration of the filtering unit 500 may be about 80 microns, and may be suitable for moderate volume operations using light or non-breaded products. The upper and lower filtering layers 520, 530 may be constructed with a stainless steel mesh screen. However, the upper and lower filtering layers 520, 530 may be configured with a different filtering material, without departing from the scope and/or spirit of the disclosure.

Edges of the upper and lower filtering layers 520, 530 may be sealed by a frame 540 or the like. The frame 540 may be fixed to the upper and lower filtering layers 520, 530 by a number of fasteners 542, such as, e.g., bolts, screws, rivets and/or the like. The fasteners 542 may be formed at the corners and/or between the corners of the frame 540 for secure sealing.

Figure 5A:
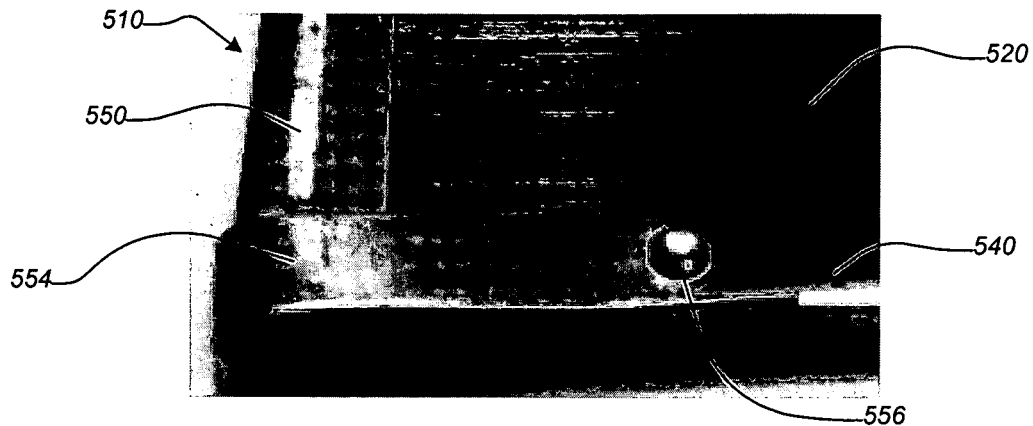
FIG. 5A shows a perspective view of a locking unit of a filtering unit shown in FIGS. 4A and 4B in a locked position.
Figure 5B:
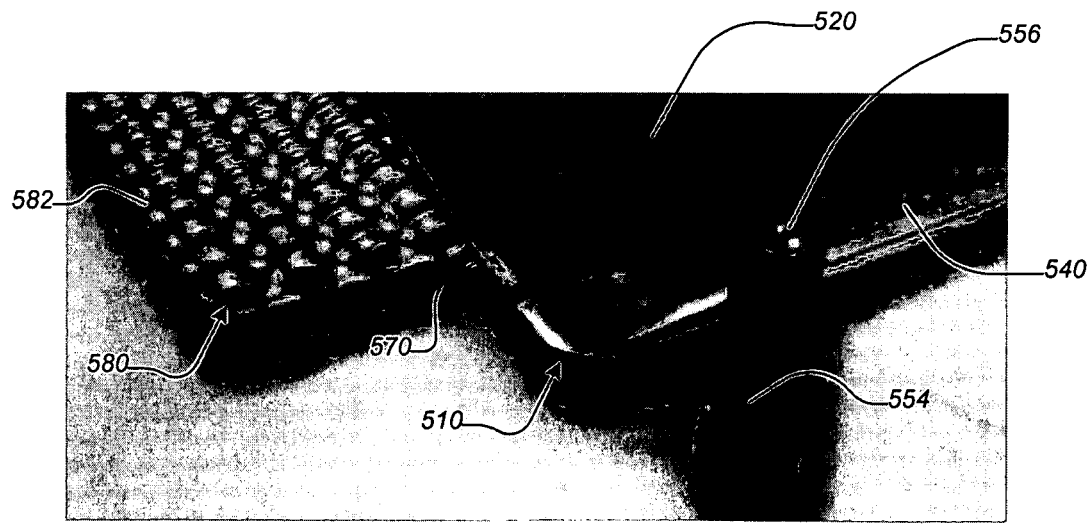
FIG. 5B shows another perspective view of the locking unit of the filtering unit shown in FIGS. 4A and 4B, in which the locking unit is in the released position.

As shown in FIGS. 4A and 4B, the filtering envelop 510 may be further configured with a cap 550 for sealing the main opening 570 of the filtering envelop 510. The cap 550 may be pivotally movable with respect to a pivot 552, as shown in FIG. 4B such that a user may pivotally rotate-open the cap 550 to expose the main opening 570 and pivotally rotate-close the cap 550 back to seal the main opening 570. The filtering envelop 510 may be further configured with a locking unit 554 to prevent the cap 550 from accidentally opening the filtering envelop 510 and exposing the main opening 570. The locking unit 554 may be located at one of two corners of the filtering envelop 510 adjoining the main opening 570. The pivot 552 for the cap 550 may be located at the other corner. The locking unit 554 may be configured to pivotally move with respect to a pivot 556. In a locked position, as shown in FIG. 5A, the locking unit 554 may hold one end of the cap 550 to prevent the cap 550 from accidentally opening the filtering envelop 510. As shown in FIG. 5B, the locking unit 554 may be pivotally pulled from the locking position to allow the pivotal movement of the cap 550. The frame 540, the cap 550 and/or the locking unit 554 may reduce or eliminate an amount of unfiltered oil penetrating the filtering unit 500 while allowing quick and easy repair and replacement.

In FIG. 4B, the filtering insert 580 may include a middle filtering layer 582, an opening 584 and a ring 586. The middle filtering layer 582 may be sandwiched between the upper and lower filtering layers 520, 530 when the filtering insert 580 is inserted into the filtering envelop 510. The middle filtering layer 582 may be configured to further filter the oil filtered by the upper and lower filtering layers 520 and 530 and transfer the filtered oil to the conveying unit 600. The middle filtering layer 582 may be constructed of a stainless steel mesh, such as a basket weave. However, the middle filtering layer 582 may be configured with a different material, arrangement and/or construction, without departing from the scope and/or spirit of the disclosure. The filtering unit 580 may be reusable and machine wash friendly to reduce the maintenance costs.

The upper and lower filtering layers 520, 530 may have openings 522, 532 (shown in FIG. 10), respectively. The openings 522, 532 of the filtering envelop 510 and the opening 584 of the filtering insert 580 may be located at center portions of the upper, lower and middle filtering layers 520, 530, 582, respectively. The openings 522, 532, 582 may align with each other when the filtering envelop 510 and the filtering insert 580 are assembled together and may form a through hole 502 (shown in FIGS. 3 and 10) extending through the filtering unit 500. The through hole 502 may be used when the filtering unit 500 and the conveying unit 600 are assembled together, which is described below in detail.

Figure 6:
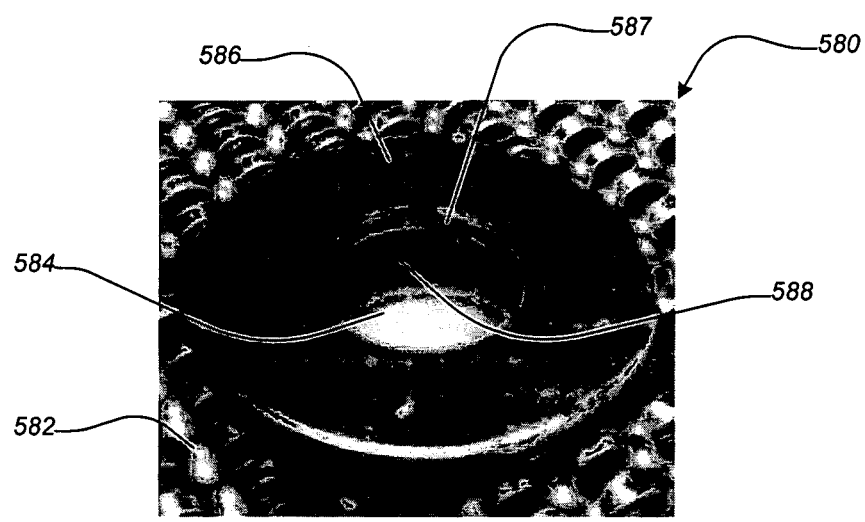
FIG. 6 shows an enlarged partial perspective view of a filtering insert of the filtering unit shown in FIG. 4B.
Figure 10:
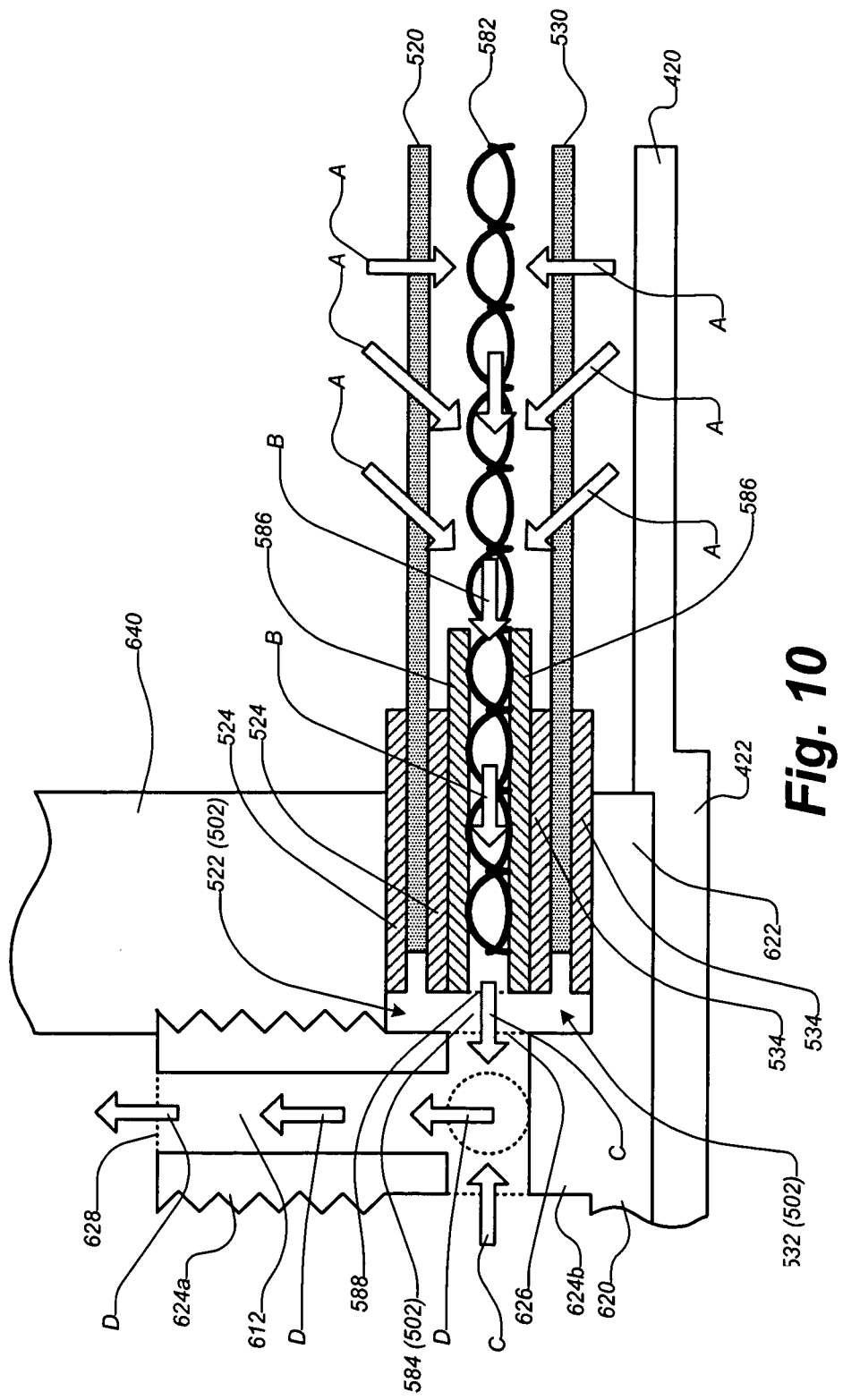
FIG. 10 shows a partial enlarged cross-sectional view of the filtering unit and the conveying unit of the oil filtering system shown in FIG. 3.

Rings 524, 534 (shown in FIG. 10), 586 may be formed around the openings 522, 532, 584, respectively. The rings 524, 534, 586 may be constructed with metal or other hard material to protect the filtering unit 500 when the filtering unit 500 and the conveying unit 600 are assembled together. Also, the rings 524, 534, 586 may prevent unfiltered oil in the main storage space 440 from penetrating the filtering unit 500 via a gap between the filtering unit 500 and the conveying unit 600. The rings 524, 534, 586 may also prevent leakage of filtered oil from the filtering unit 500 to the main storage space 440. Further, when stacked together, the rings 524, 534, 586 may ensure an uninterrupted oil transfer path from the filtering unit 500 to the conveying unit 600, which is described below in detail. In FIG. 6, the ring 586 of the filtering insert 580 may have one or more openings 588 to direct the filtered oil from the middle filtering unit 582 towards the opening 584, which may be occupied by the conveying unit 600 as shown in FIG. 10. The openings 588 may be formed on a circular side surface 587 of the ring 586 that surrounds the opening 584.

As shown in FIGS. 3, 4A and 4B, the conveying unit 600 may be configured with a first end portion 610 configured to engage the filtering unit 500, a second end portion 690 configured to engage a corresponding coupler 691 (shown in FIG. 3), a tube 670 running between the first and second end portions 610, 690, and/or the like. The first end portion 610 may be configured to removably connect the conveying unit 600 to the filtering unit 500 and convey the filtered oil from the filtering unit 500 to the tube 670. The first end portion 610 may provide a firm engagement between the filtering unit 500 and the conveying unit 600 in order to prevent the conveying unit 600 from being moved and disconnected from the coupler 691. Also, the first end portion 610 may be configured such that the user may easily disengage the conveying unit 600 from the filtering unit 500 to clean and/or replace the filtering unit 500. The first end portion 610 may be configured with a male member 620, a female member 640, an oil path 612 (shown in FIG. 10) and/or the like. The oil path 612 may extend through the male member 620 and the female member 640 to convey the filtered oil from the filtering unit 500 to the tube 670. The male member 620 and the female member 640 may be configured to detachably engage each other with the filtering unit 500 therebetween.

Figure 7:
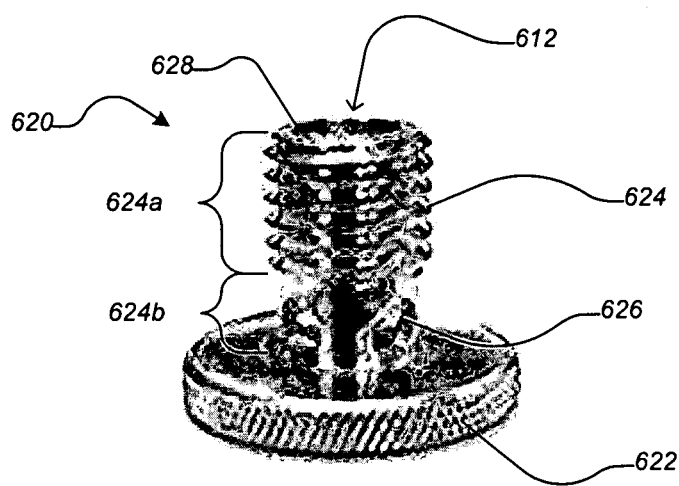
FIG. 7 shows a side view of a male member of the conveying unit shown in FIG. 3.

FIG. 7 shows a side view of the male member 620 of the first end portion 610. The male member 620 may be configured with a base 622 and a protruded portion 624 extending from the base 622. As shown in FIG. 10, the base 620 may be arranged between the bottom wall 420 of the storage unit 400 and the lower filtering layer 530. The base 620 may have a diameter greater than that of the through hole 502 of the filtering unit 500. As shown in FIG. 3, to accommodate the base 620, a recess 422 may be formed at the bottom wall 420 of the storage unit 400. The recess 422 may ensure that the filtering unit 500 stays stable on the bottom wall 420 of the storage unit 400. Additionally, the recess 422 may be the lowest point in the storage unit 400 which may help to direct oil to the same via gravity thus enabling better return of the oil.

The protruded portion 624 of the male member 620 may traverse the filtering unit 500 via the through hole 502 and engage the female member 640 arranged on the upper filtering layer 520. The protruded portion 624 may be configured with an upper portion 624a and a lower portion 624b. The upper portion 624a may be threaded to form a screw joint with the female member 640. As shown in FIG. 10, the upper portion 624a may at least partially stick out upwardly from the filtering layer 500. An opening 628 may be formed at a top of upper portion 624a. The opening 628 may be connected to the oil path 612. A lower portion 624b of the protruded portion 624 may include one or more ports 626 configured to receive filtered oil from the filtering unit 500. The oil path 612 of the male member 620 may be extended from the ports 626 to the opening 628.

Figure 8:
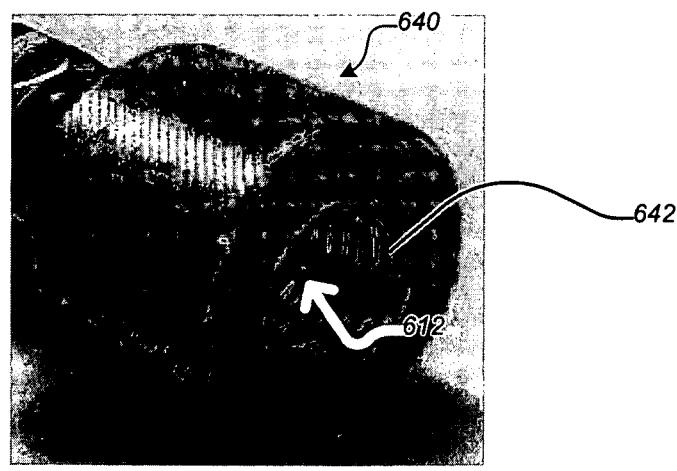
FIG. 8 shows a perspective view of a female member of the conveying unit shown in FIG. 3.
Figure 9:
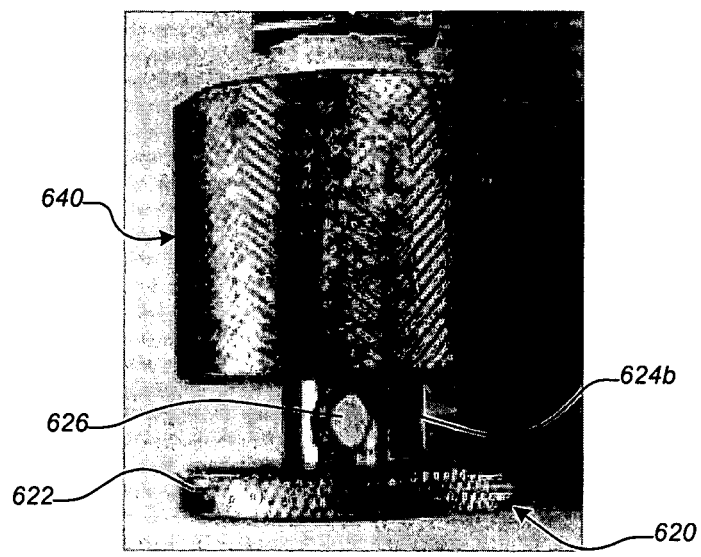
FIG. 9 shows a side view of an assembly of the male member and the female member shown in FIGS. 5 and 6, respectively.

FIG. 8 shows a perspective view of the female member 640 of the first end portion 610. The female member 640 may be arranged on the upper filtering layer 520 and configured to engage the upper portion 624a of the protruded portion 624 of the male member 620. The female member 640 may have an opening 642 connecting to the oil path 612. The inner surface of the female member 640 surrounding the oil path 612 near the opening 642 may be threaded to form the screw joint with the male member 620. FIG. 9 shows a side view of an assembly of the male member 620 and the female member 640 without the filtering unit 500 therebetween. As shown in FIG. 10, when the male member 620 and the female member 640 are engaged to each other with the filtering unit 500 therebetween, the ports 626 of the lower portion 624b of the male member 620 may be arranged adjacent to openings 588 of the filtering insert 580 to receive the filtered oil therefrom.

As shown in FIG. 3, the tube 670 may extend from the first end portion 610 of the conveying unit 600 towards outside and/or the opening 430 of the storage unit 400. For example, as shown in 3, the tube 670 may extend perpendicularly from the first end portion 610, bend toward the side wall 410 and then extend upwardly along the inner surface of the side wall 410. A support clip 414 may be arranged to hold the portion of the oil tube 670 extending along the side wall 410. Then, the oil tube 670 may be bent again towards the second end portion 690. The support clip 414 may be a hook, a slotted structure, a releasable retainer or any type of device capable of holding the tube 670.

To ensure smooth engagement between the second end portion 690 and the coupler 691, it may be necessary to adjust the height of the conveying unit 600. For this purpose, the conveying unit 600 may include a height adjustment unit. For example, as shown in FIG. 3, a jam nut 672 may be formed between the first end portion 610 and the tube 670 such that the user may pull or push the tube 670 to increase or decrease the height of the conveying unit 600. Once the desired height is achieved, the user may tighten the jam nut 672 such that the tube 600 may not move vertically.

FIG. 10 shows a partial enlarged cross-sectional view of the filtering unit 500 and the conveying unit 600 of the oil filtering system shown in FIG. 3. As described above, to withstand the pressure from the screw joint formed between the male member 620 and the female member 640, the rings 524, 534, 586 may be formed around the openings 522, 532, 584, respectively. When the rings 524, 534, 586 are stacked together between the base 622 of the male member 620 and a bottom surface the female member 640, the openings 588 of the ring 586 of the filtering insert 580 may be arranged adjacent to the ports 626 of the male member 620.

With this configuration, when a suction operation starts to recycle the oil in the storage unit 400, the oil may be sucked into the filtering unit 500 via both the upper filtering layer 520 and the lower filtering layer 530, as shown by arrows A. The oil filtered by the upper and lower filtering layers 520, 530 may be further filtered by the middle filtering layer 582 while moving towards the openings 588 of the ring 586, as shown by arrows B. The oil filtered by the filtering unit 500 may then exit the filtering unit 500 via the openings 588 and enter the conveying unit 600 via the ports 626, as shown by arrows C. The filtered oil may move upwardly along the oil path 612 and exit the male member 620 via the opening 628. The filtered oil may eventually arrive at the coupler 691 via the female member 640, the tube 670 and the second end portion 690.

Figure 11A:
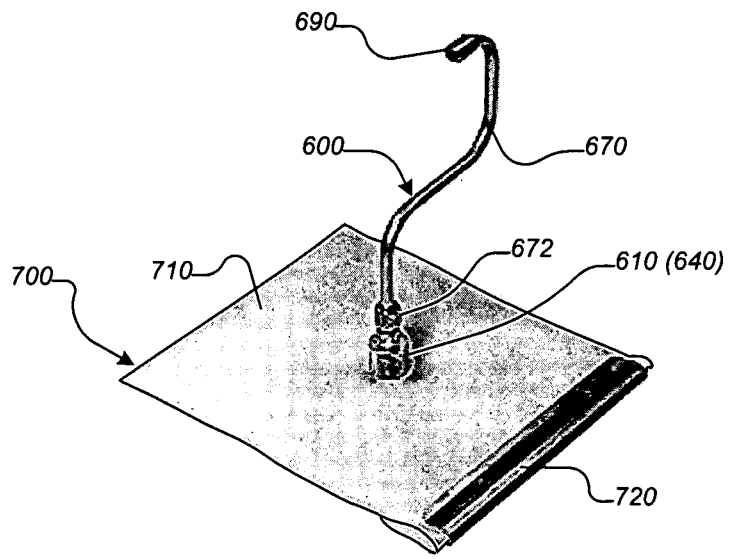
FIG. 11A shows a perspective view of an assembly of another filtering unit along with the conveying unit shown in FIG. 3A, constructed according to an embodiment of the disclosure.
Figure 11B:
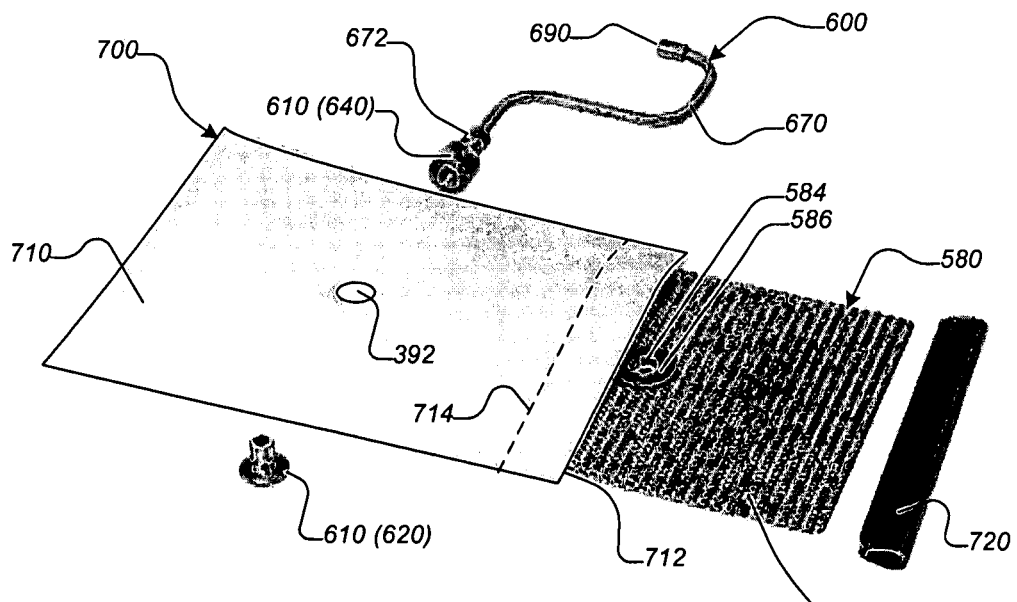
FIG. 11B shows an exploded perspective view of the filtering unit and the conveying unit shown in FIG. 11A.

FIG. 11A shows a perspective view of an assembly of the conveying unit 600 shown in FIG. 3 and another filtering unit 700, and FIG. 11B show an exploded perspective view of the filtering unit 700 and the conveying unit 600 of FIG. 11A, constructed according to an embodiment of the disclosure. The filtering unit 700 may be constructed with a filtering envelop 710 and a filtering insert 580. The filtering envelop 710 may be constructed with a micro-filtration fabric, which may have a particulate filtration of about 0.5 micron. The micro-filtration fabric may be suitable for commercial applications, such as restaurants or cafeterias, and may be used for two to three weeks depending on the usage and menu items. The micro-filtration fabric may significantly improve the filtering quality compared to conventional metal mesh screens and paper envelops, and reduce the likelihood of clogging in the conveying unit 600 and hence repair frequency. For example, the particulate filtration of the paper envelops is about 30 micron.

The filtering envelop 710 may have a main opening 712 exposing an inner space thereof. The filtering insert 580 may be inserted into the inner space of the filtering envelop 710 via the main opening 712. The filtering envelope 710 may be folded over along a line 714 to wrap the filtering insert 580. A removable clip 720 may be used to keep the filtering envelop 710 held and folded along the line 714. The conveying unit 600 and the filtering unit 700 may be assembled together in a manner similar to the assembly of the filtering unit 500 and the conveying unit 600 mentioned above.

The oil filtering system 300 constructed in accordance with the embodiments of the disclosure thus may have a number of advantages over the prior art. In particular, the oil filtering system 300 may be less expensive to manufacture and maintain because the oil filtering system 300 may have a simpler construction with fewer parts, and may require fewer manufacturing and maintenance steps than the conventional system. For example, the storage unit 400 may have no holes or welds. Also, there may be no structure outside of the storage unit 400 as in many conventional arrangements. Further, the bottom of the storage unit 400 has minimal protrusions, thereby reducing any clearance problems between the storage unit 400 and any structure that may be on the floor. Furthermore, the filtering unit 500 may be easily removed from the storage unit 400 for cleaning or replacement. Also, the filter being double sided may also have a greater filtering area that may increase filtering speed, the extent of filtering and/or the like. The arrangement of the invention also may be easily retrofitted into prior art designs with only minor modification. The arrangement may also provides for heating of the pipes, thus reducing clogging due to solidified oil.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. An oil filtering system comprising:
    a storage unit configured to receive and hold oil from a fryer in a main storage space thereof, the storage unit comprising an inner bottom surface having a recess therein;
    a filtering unit removably arranged on the inner bottom surface of the storage unit within the main storage space and configured to filter the oil in the storage unit via lower and upper filtering layers thereof; and
    a conveying unit removably connected to the filtering unit and having a portion extending upwardly from the filtering unit within the main storage space for conveying the filtered oil from the filtering unit,
    wherein the conveying unit comprises:
    a first end portion connected to the filtering unit;
    a second end portion arranged outside the main storage space, the second end portion configured to connect to a coupler of the fryer and convey oil between the main storage space and the fryer; and
    a tube extending between the first end portion and the second end portion;
    wherein the conveying unit further comprises a height adjustment unit configured to increase or decrease a height of the conveying unit and change the vertical position of the second end portion in order to be at the same vertical height as the coupler;
    wherein the filtering unit comprises:
    a first filtering unit comprising the lower and upper filtering layers and configured to filter the oil from the main storage space via the lower and upper filtering layers;
    a second filtering unit comprising a middle filtering layer removably arranged between the lower and upper filtering layers and configured to filter the oil filtered by the lower and upper filtering layers;
    a through hole extending through the lower, middle and the upper filtering layers;
    a first ring covering a portion of the middle filtering layer around the through hole, the first ring comprising at least one opening arranged adjacent to the at least one oil port of the first end portion;
    a second ring covering a portion of the lower filtering layer around the through hole; and
    a third ring covering a portion of the upper filtering layer around the through hole, wherein the first ring is arranged between the second and third rings, and the first, second, third rings are stacked together and arranged between a male member and female member; and
    a base separate from and vertically beneath the first filtering unit and second filtering unit to support the filtering unit in the storage unit, wherein the base is configured to be received in the recess arranged in the inner bottom surface of the storage unit and the base further configured to support the first filtering unit and the second filtering unit vertically above the inner bottom surface to form a space therebetween.

2. The oil filtering system of claim 1, wherein the storage unit comprises a bottom wall, side walls and a main opening exposing the main storage space surrounded by the bottom wall and the side walls.

3. The oil filtering system of claim 1, wherein the filtering unit is machine-washable.

4. The oil filtering system of claim 1, wherein the middle filtering layer comprises stainless steel basket weave mesh.

5. The oil filtering system of claim 1, wherein the lower and upper filtering layers comprise a stainless steel mesh screen.

6. The oil filtering system of claim 5, wherein particulate filtration of the filtering unit is about 80 microns.

7. The oil filtering system of claim 5, wherein the first filtering unit further comprises:
    a frame configured to seal edges of the lower and upper filtering layers;
    an opening exposing an inner space between the lower and upper filtering layers; and
    a removable cap configured to seal the opening.

8. The oil filtering system of claim 1, wherein the lower and upper filtering layers comprise a micro-filtration fabric.

9. The oil filtering system of claim 8, wherein the first filtering unit comprises:
    a filtering envelope comprising the lower and upper filtering layers and an opening exposing an inner space between the lower and upper filtering layers; and
    a removable clip for sealing the opening of the filtering envelope.

10. The oil filtering system of claim 8, wherein particulate filtration of the filtering unit is about 0.5 micron.

11. The oil filtering system of claim 1, wherein the first end portion of the conveying unit comprises: a male member comprising:
    a base arranged between the inner bottom surface of the storage unit and the lower filtering layer;
    a protruded portion extended from the base and traversing the through hole of the filtering unit; and a female member arranged on the upper filtering layer and configured to removably engage the protruded portion of the male member.

12. The oil filtering system of claim 11, wherein the recess is formed on the inner bottom surface thereof to receive the base of the male member, the recess configured to be the lowest point in the storage unit.

13. The oil filtering system of claim 11, wherein the first end portion further comprises:
- at least one oil port formed at the protruded portion of the male member and arranged adjacent to the middle filtering layer to receive the filtered oil therefrom; and
- an oil path extended from the at least one oil port to the tube to convey the filtered oil from the at least one oil port to the tube.

14. The oil filtering system of claim 11, wherein the protruded portion of the male member and the female member form a screw connection.

15. The oil filtering system of claim 1, wherein the height adjustment unit comprises a tube, a jam nut, and the first end portion.

16. The oil filtering system of claim 1, wherein the tube comprises:
- a first portion extending vertically from the first end portion towards the main opening of the storage unit; a second portion extending horizontally from the first portion towards the side wall of the storage unit;
- a third portion extending vertically from the second portion along the side wall of the storage unit towards an outside of the main storage space of the storage unit; and
- a fourth portion arranged outside the main storage space and extending from the third portion towards the second end portion.

17. The oil filtering system of claim 16, further comprising a holding unit arranged on an inner surface of the sidewall and configured to support the third portion of the tube.

18. The oil filtering system of claim 1, further comprising an oil suction unit configured to engage the second end portion of the conveying unit.

19. The oil filtering system of claim 1, wherein the height adjustment unit comprises a tube, a jam nut, and the first end portion; and the first end portion is configured to allow the tube to move vertically with respect to the filtering unit to change the vertical position of the second end portion.

20. An oil filtering system comprising:
- a storage unit configured to receive and hold oil from a fryer in a main storage space thereof, the storage unit comprising an inner bottom surface having a recess therein;
- a filtering unit removably arranged on the inner bottom surface of the storage unit within the main storage space and configured to filter the oil in the storage unit via lower and upper filtering layers thereof; and
- a conveying unit removably connected to the filtering unit and having a portion extending upwardly from the filtering unit within the main storage space for conveying the filtered oil from the filtering unit, wherein the conveying unit comprises:
- a first end portion connected to the filtering unit;
- a second end portion arranged outside the main storage space, the second end portion configured to connect to a coupler of the fryer and convey oil between the main storage space and the fryer; and
- a tube extending between the first end portion and the second end portion;

wherein the conveying unit further comprises a height adjustment unit configured to increase or decrease a height of the conveying unit and change the vertical position of the second end portion in order to be at the same vertical height as the coupler;

wherein the filtering unit comprises:
- a first filtering unit comprising the lower and upper filtering layers and configured to filter the oil from the main storage space via the lower and upper filtering layers;
- a second filtering unit comprising a middle filtering layer removably arranged between the lower and upper filtering layers and configured to filter the oil filtered by the lower and upper filtering layers; and
- a base to support the filtering unit above the inner bottom surface of the storage unit, wherein the recess is sized to receive the base, and the base is configured to be received in the recess arranged in the inner bottom surface of the storage unit and the base further configured to support the first filtering unit and the second filtering unit above the inner bottom surface to form a space between the first filtering unit and the inner bottom surface, wherein the first filtering unit and the second filtering unit are wider than the recess and extend away from the recess.

* * * * *